(12) United States Patent
Miyagawa

(10) Patent No.: US 10,001,400 B2
(45) Date of Patent: Jun. 19, 2018

(54) LIQUID-LEVEL DETECTION DEVICE

(71) Applicant: DENSO CORPORATION, Kariya, Aichi-pref. (JP)

(72) Inventor: Isao Miyagawa, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 137 days.

(21) Appl. No.: 14/904,341

(22) PCT Filed: Jul. 9, 2014

(86) PCT No.: PCT/JP2014/003647
§ 371 (c)(1),
(2) Date: Jan. 11, 2016

(87) PCT Pub. No.: WO2015/008457
PCT Pub. Date: Jan. 22, 2015

(65) Prior Publication Data
US 2016/0153823 A1   Jun. 2, 2016

(30) Foreign Application Priority Data

Jul. 16, 2013  (JP) ................................. 2013-147712
Jun. 16, 2014  (JP) ................................. 2014-123434

(51) Int. Cl.
*G01F 23/32*  (2006.01)
*G01F 23/38*  (2006.01)

(52) U.S. Cl.
CPC .................... *G01F 23/38* (2013.01)

(58) Field of Classification Search
CPC ........ G01F 23/38; G01F 23/363; G01F 23/36; G01F 23/32; G01F 23/34
(Continued)

(56) References Cited

U.S. PATENT DOCUMENTS

| | | | | |
|---|---|---|---|---|
| 7,331,225 B2 * | 2/2008 | Fukuhara | ................ | G01F 23/38 73/317 |
| 2005/0083045 A1 * | 4/2005 | Miyagawa | .............. | G01F 23/38 324/207.25 |

(Continued)

FOREIGN PATENT DOCUMENTS

| | | |
|---|---|---|
| JP | H11023213 A | 1/1999 |
| JP | 2001264006 A | 9/2001 |

(Continued)

OTHER PUBLICATIONS

International Search Report and Written Opinion (in Japanese with English Translation) for PCT/JP2014/003647, dated Oct. 14, 2014; ISA/JP.

*Primary Examiner* — Andre Allen
(74) *Attorney, Agent, or Firm* — Harness, Dickey & Pierce, P.L.C.

(57) ABSTRACT

A liquid-level detection device includes a rotatable body that rotates in accordance with a liquid surface, a fixation body that includes a main body part fixed to a container and a supporting part projecting from the main body part in an axial direction along a rotation axis of the rotatable body to rotatably support the rotatable body, a pair of magnet parts that are held by the rotatable body in an arrangement positioning the supporting part therebetween and that generates a magnetic flux passing through the supporting part, and a detecting part that includes a magnetoelectric conversion device disposed in the supporting part and that outputs a detection result according to a density of the magnetic flux passing through the magnetoelectric conversion device. The rotatable body includes a magnetic shield member entirely covering a projection region of a space located between the pair of magnet parts, which is projected outward in the axial direction, to limit leakage of the magnetic flux. The magnetic shield member is located outward of the supporting (Continued)

part and the pair of magnet parts in the axial direction to include an exposed surface which is exposed into the container.

8 Claims, 6 Drawing Sheets

(58) Field of Classification Search
 USPC .......................................................... 73/317
 See application file for complete search history.

(56) References Cited

U.S. PATENT DOCUMENTS

| | | | | | |
|---|---|---|---|---|---|
| 2007/0090832 | A1* | 4/2007 | Yasuda | ............... | G01F 23/38 324/207.25 |
| 2008/0072668 | A1* | 3/2008 | Miyagawa | ............ | G01F 23/363 73/319 |
| 2008/0231267 | A1* | 9/2008 | Miyagawa | ............... | G01F 23/38 324/207.25 |
| 2012/0011931 | A1* | 1/2012 | Ichisawa | ................. | G01F 23/38 73/317 |
| 2012/0174667 | A1* | 7/2012 | Miyagawa | ............... | G01F 23/36 73/304 R |
| 2012/0210782 | A1* | 8/2012 | Downs | .................... | G01F 23/38 73/317 |
| 2012/0285240 | A1* | 11/2012 | Yasuda | ................... | G01F 23/38 73/313 |
| 2012/0304761 | A1* | 12/2012 | Miyagawa | ............... | G01F 23/36 73/304 C |
| 2016/0123789 | A1* | 5/2016 | Deak | ....................... | G01F 23/38 73/317 |
| 2016/0161321 | A1* | 6/2016 | Miyagawa | ............... | G01F 23/38 73/317 |

FOREIGN PATENT DOCUMENTS

| | | | |
|---|---|---|---|
| JP | 2003214896 A | | 7/2003 |
| JP | 2004333283 A | | 11/2004 |
| JP | 2005010047 A | * | 1/2005 |
| JP | 2006153679 A | | 6/2006 |
| JP | 2008224574 A | | 9/2008 |
| JP | 2013137256 A | | 7/2013 |
| WO | WO-2013099544 A1 | | 7/2013 |

* cited by examiner

LIQUID-LEVEL DETECTION DEVICE

CROSS REFERENCE TO RELATED APPLICATIONS

This application is a U.S. National Phase Application under 35 U.S.C. 371 of International Application No. PCT/JP2014/003647 filed on Jul. 9, 2014 and published in Japanese as WO 2015/008457 A1 on Jan. 22, 2015. This application is based on and claims the benefit of priority from Japanese Patent Application No. 2013-147712 filed on Jul. 16, 2013 and Japanese Patent Application No. 2014-123434 filed on Jun. 16, 2014. The entire disclosures of all of the above applications are incorporated herein by reference.

TECHNICAL FIELD

The present disclosure relates to a liquid-level detection device that detects a level of a surface of liquid stored in a container.

BACKGROUND ART

Conventionally, there is known a liquid-level detection device that detects a surface level of liquid stored in a container. A liquid-level detection device described in Patent Document 1 includes an annularly-shaped magnet part held by a rotatable body and a magnetoelectric conversion device that detects the density of magnetic flux changing according to the rotation of the magnet part. Moreover, a magnetic shield member made of iron nickel is provided to cover the bottom portion and the outer peripheral surface of the magnet part. Accordingly, the attraction and attachment of metallic foreign matter mixed in the liquid in the container to the magnet part can be restrained. As a result, the accuracy in output of the magnetoelectric conversion device can be stabilized.

PRIOR ART DOCUMENT

Patent Document

Patent Document 1: JP2006-153679A

However, the inventor finds that the accuracy in output of the magnetoelectric conversion device may be influenced by the metallic foreign matter even though the metallic foreign matter is not attached directly to the magnet part.

In this regard, due to the leakage flux outward of an exposed surface in the liquid-level detection device described in Patent Document 1, when a magnetic circuit is configured with the metallic foreign matter attached on the exposed surface, the change of the density of magnetic flux passing through an element part may reduce the output of the magnetoelectric conversion device.

SUMMARY OF INVENTION

The present disclosure addresses the above-described issues. Thus, it is an objective of the present disclosure to provide a liquid-level detection device that limits configuration of a magnetic circuit with metallic foreign matter attached on an exposed surface to stabilize accuracy in output of a magnetoelectric conversion device.

A liquid-level detection device in a first aspect of the present disclosure is for detecting a level of a surface of liquid stored in a container. The liquid-level detection device includes a rotatable body that rotates in accordance with the surface of liquid, a fixation body that includes a main body part fixed to the container and a supporting part projecting from the main body part in an axial direction along a rotation axis of the rotatable body to rotatably support the rotatable body, a pair of magnet parts that are held by the rotatable body in an arrangement positioning the supporting part therebetween and that generates a magnetic flux passing through the supporting part, and a detecting part that includes a magnetoelectric conversion device disposed in the supporting part and that outputs a detection result according to a density of the magnetic flux passing through the magnetoelectric conversion device. The rotatable body includes a magnetic shield member entirely covering a projection region of a space located between the pair of magnet parts, which is projected outward in the axial direction, to limit leakage of the magnetic flux. The magnetic shield member is located outward of the supporting part and the pair of magnet parts in the axial direction to include an exposed surface which is exposed into the container.

The liquid-level detection device in this aspect includes the detecting part that outputs the detection result according to the density of the magnetic flux passing through the magnetoelectric conversion device, by the pair of magnet parts that are held by the rotatable body rotatable in accordance with the surface of liquid and that generates the magnetic flux passing through the supporting part. Accordingly, the liquid surface level can be detected with high accuracy by the magnetoelectric conversion device. The magnetic shield member for limiting leakage of the magnetic flux is provided to entirely cover the projection region of the space located between the pair of magnet parts, which is projected outward in the axial direction, for the exposed surface of the rotatable body which is located in the direction of projection of the supporting part and the pair of magnet parts and which is exposed into the container. Consequently, the configuration of the magnetic circuit can be restricted by the connection of the metallic foreign matter attached on the exposed surface on the projection region. As a result, the accuracy in output of the magnetoelectric conversion device can be stabilized.

In a second aspect of the present disclosure, a density of the magnetic flux passing through the magnetic shield member from each of the pair of magnet parts does not exceed a saturated magnetic flux density of the magnetic shield member.

In this aspect, the magnetic flux passing from each magnet part toward the exposed surface does not easily escape outward of the magnetic shield member by the magnetic shield member through which the density of magnetic flux passing through from each magnet part does not exceed the saturated magnetic flux density. Thus, the magnetic flux leakage can be inhibited.

In a third aspect of the present disclosure, the magnetic shield member is obtained by mixing magnetic powder with resin.

In this aspect, since the magnetic shield member is obtained by mixing magnetic powder with resin, the magnetic shield member weighs less. As a consequence, the liquid-level detection device that is lightweight and that constitutes the magnetic circuit by the metallic foreign matter attached on the exposed surface to stabilize accuracy in output of the magnetoelectric conversion device can be achieved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
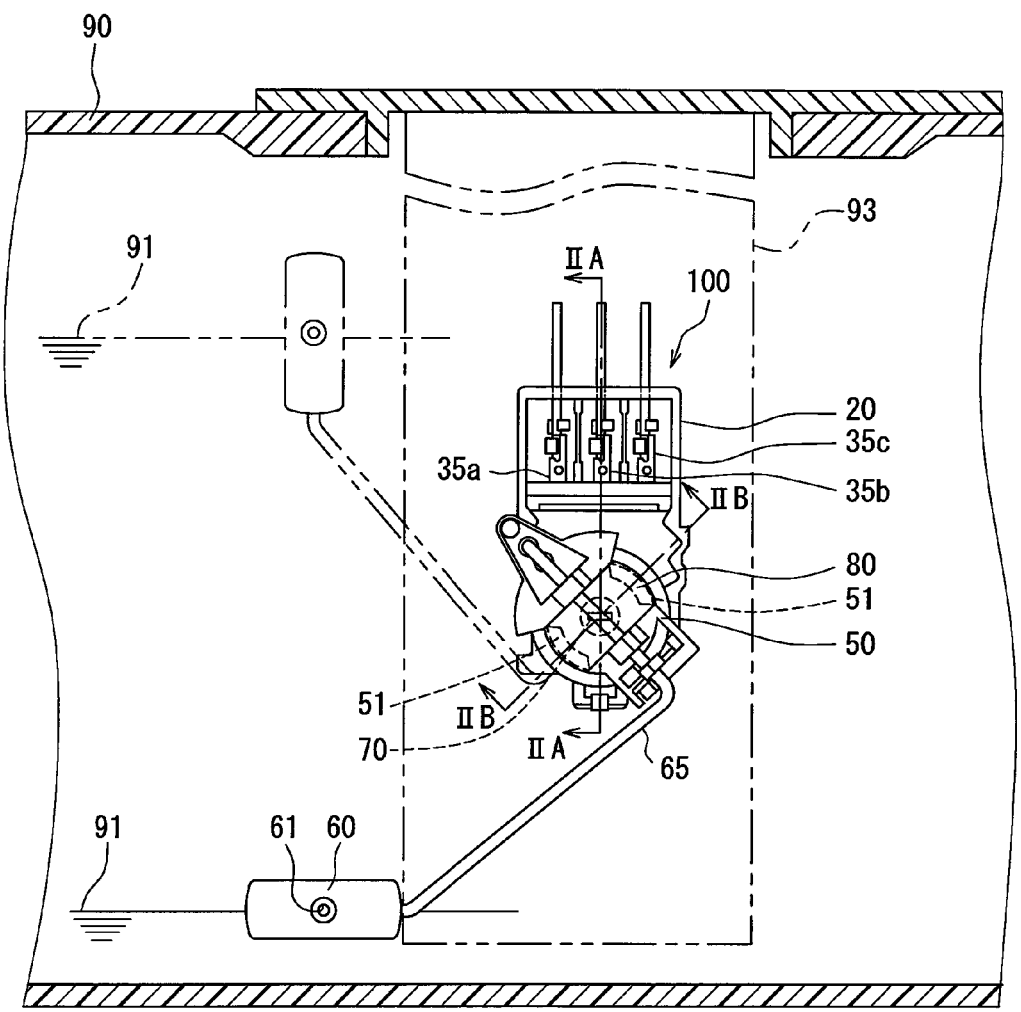
FIG. 1 is a front view illustrating a liquid-level detection device in accordance with a first embodiment.

Embodiments will be described below in reference to the drawings. Using the same reference numeral for corresponding components throughout the embodiments, a repeated description may be omitted. In a case of description of only a part of configuration in each embodiment, a configuration in another embodiment explained ahead of the embodiment can be applied to the other part of the configuration. In addition to a combination of the configurations indicated in the descriptions of the embodiments, the configurations in the embodiments can be partially combined together even without explanation thereof as long as this combination functions.

First Embodiment

As illustrated in FIG. 1, a liquid-level detection device 100 according to a first embodiment is disposed in a fuel tank 90 storing fuel for liquid. The liquid-level detection device 100 detects a level of a liquid surface 91 of fuel in the fuel tank 90 with the device 100 held by a fuel pump module 93, for example. The liquid-level detection device 100 includes a housing 20, a float 60, a magnet holder 50, and a Hall IC 70.

Figure 2:
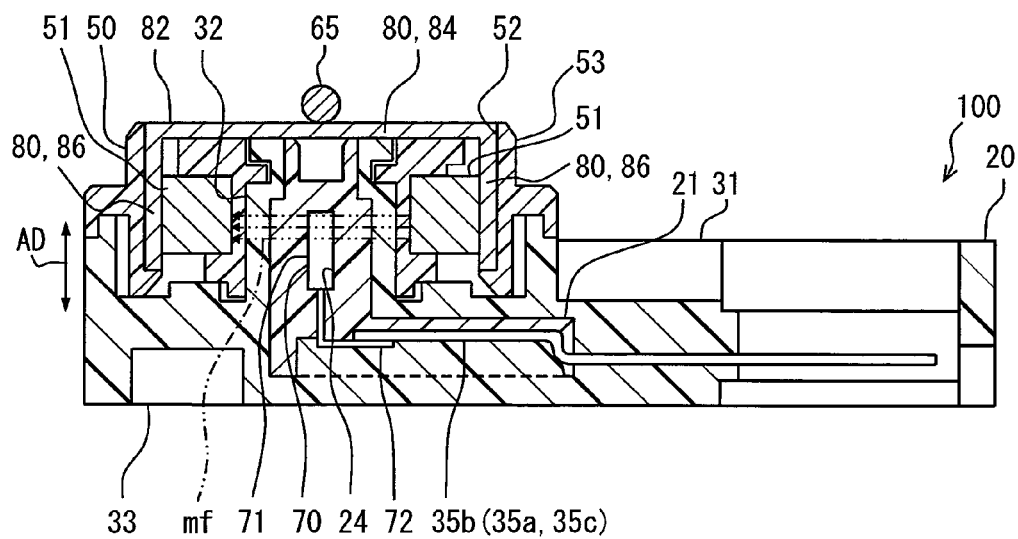
FIG. 2 is a diagram illustrating a combination of a sectional view of a housing taken along a line IIA-IIA in FIG. 1 and a sectional view of a magnet holder taken along a line IIB-IIB in FIG. 1.

The housing 20 illustrated in FIG. 2 includes an inner case 21, terminals 35a to 35c, and an outer case 31. The inner case 21 is formed from a resin material such as polyphenylene sulfide (PPS) resin. An element accommodating chamber 24 accommodating the Hall IC 70 is provided in the inner case 21. The three terminals 35a to 35c (see also FIG. 1) are formed in a band plate-shape from an electrically-conductive material such as phosphor bronze. Each of the three terminals 35a to 35c is used for transmission of a detection signal of voltage or the like, between an external device (e.g., combination meter) and the Hall IC 70. The outer case 31 is formed from a resin material such as PPS resin. The outer case 31 is formed to cover the outside of the inner case 21, and the outer case 31 thereby accommodates the inner case 21. The outer case 31 includes a shaft part 32.

The shaft part 32 projects cylindrically from a main body part 33 that is fixed to the fuel tank 90 (see FIG. 1) via the fuel pump module 93 (see FIG. 1). The shaft part 32 is fitted into the magnet holder 50 to rotatably support the holder 50.

The float 60 illustrated in FIG. 1 is formed from a material with lower specific gravity than fuel, such as foamed ebonite. The float 60 can float on the liquid surface 91 of fuel. The float 60 is supported by the magnet holder 50 via a float arm 65. The float arm 65 is formed in a round bar shape from a magnetic material such as stainless steel, and is inserted through a through hole 61, which is formed at the float 60.

The magnet holder 50 illustrated in FIGS. 1 and 2 is formed in a disc shape from a resin material or the like. The magnet holder 50 includes a main body rotation part 53 and a magnetic shield member 80 serving as a holder cover. The magnet holder 50 holds the float arm 65 and is fitted outside the shaft part 32 to be supported rotatably relative to the housing 20. As a result of the above-described configuration, the magnet holder 50 rotates relative to the housing 20 integrally with a magnet 51 in accordance with the liquid surface 91. A pair of magnets 51 are accommodated in this magnet holder 50. The pair of magnets 51 are formed sectorally into the same shape as each other, and are held with the rotation axis of the holder 50 arranged therebetween. Accordingly, inner peripheral surfaces 511 of the pair of magnets 51 are opposed to each other with the shaft part 32 therebetween. Accordingly, the pair of magnets 51 produce magnetic flux mf passing through the Hall IC 70 accommodated in the element accommodating chamber 24.

The Hall IC 70 illustrated in FIG. 2 is a detection element that detects a relative angle of the magnet holder 50 relative to the housing 20. The Hall IC 70 includes a magnetoelectric conversion device 71 and three lead wires 72. The magnetoelectric conversion device 71 is formed in a flat plate shape, and is accommodated in the element accommodating chamber 24, which is provided in the shaft part 32, to be located between the pair of magnets 51. The lead wires 72 extend out of the magnetoelectric conversion device 71 and are connected to the terminals 35a to 35c, respectively. The Hall IC 70 has its magnetoelectric conversion device 71 acted upon by the magnetic field from the magnets 51 in a voltage application state so as to generate a voltage in accordance with (e.g., proportional to) the density of the magnetic flux mf passing through the Hall IC 70. The voltage generated in the Hall IC 70 is measured by the external device as a signal indicating the detection result through the lead wires 72, the terminals 35a to 35c and so forth.

In the above-described liquid-level detection device 100 illustrated in FIG. 1, the reciprocating operation of the float 60 moving vertically in accordance with the liquid surface 91 of fuel is converted into a rotational movement through the float arm 65 which is held by the magnet holder 50, and is transmitted to these integrated components 50, 65. For this reason, the magnet holder 50 rotates relative to the housing 20 in accordance with the liquid surface 91 of fuel accumulated in the fuel tank 90. The magnetic flux density of the magnetic field applied to the Hall IC 70 changes due to this relative rotation of the magnet holder 50. Accordingly, the voltage outputted from the Hall IC 70 changes. In this manner, the liquid-level detection device 100 realizes the detection of the rotation angle of the magnet holder 50, and eventually realizes the detection of the level of the liquid surface 91 of fuel.

Details of the magnetic shield member 80 of the magnet holder 50 will be further described with reference to FIG. 2. The magnetic shield member 80 is formed in a cylindrical shape having a bottom by a main body plate part 84 and a cylindrical plate part 86 which are integrally formed. The magnetic shield member 80 has its cylindrical plate part 86 fitted in between an outer peripheral surface 513 of each magnet 51 and the main body rotation part 53. The magnetic shield member 80 is fixed to the main body rotation part 53 by, for example, thermal caulking. By this fixation, the magnetic shield member 80 can rotate integrally with the magnet holder 50.

In the following description, the direction of the projection of the shaft part 32 is referred to as an axial direction AD, and the direction in which the pair of magnets 51 are opposed to each other is referred to as an opposing direction FD. Furthermore, the direction that is substantially perpendicular to the opposing direction FD along an exposed surface 82, which will be hereinafter described, is referred to as a width direction WD.

Figure 3:
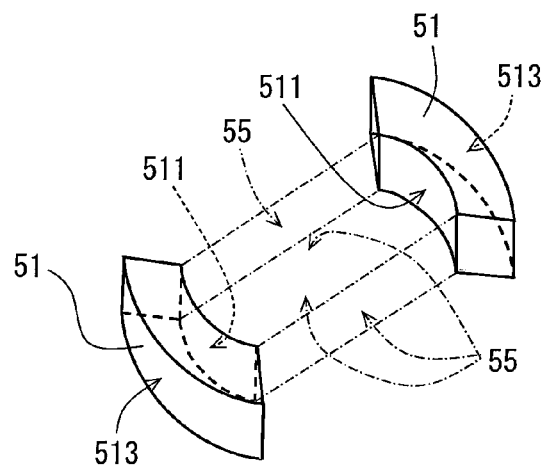
FIG. 3 is a schematic view illustrating an imaginary plane in the first embodiment.

The main body plate part 84 is formed into a plate-shape, and is located outside of the shaft part 32 and the magnets 51 (see FIG. 1) in the axial direction AD. An outer surface of this main body plate part 84 that is exposed into the fuel tank 90 (see FIG. 1) is the exposed surface 82. The region obtained by projecting the space located between the pair of magnets 51 outward in the axial direction AD onto the exposed surface 82 is referred to as a projection region 57. The space located between the pair of magnets 51 is a space surrounded with imaginary planes 55 (see FIG. 3) that connect together of the outline of the inner peripheral surface 511 of one magnet 51 and the outline of the inner peripheral surface 511 of the other magnet 51.

Figure 4:
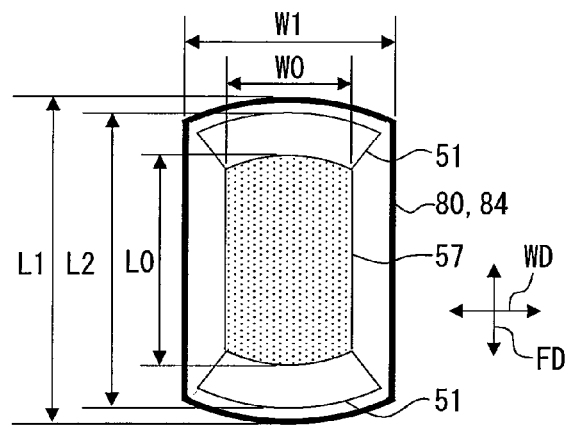
FIG. 4 is a schematic view illustrating a projection region and a range covered with a magnetic shield member in the first embodiment.

As illustrated in FIG. 4, the entire part of this projection region 57 is covered by the main body plate part 84 of the magnetic shield member 80. The size of the projection region 57 in the opposing direction FD is referred to as a length L0 of the projection region 57, and the size of the projection region 57 in the width direction WD is referred to as a width W0 of the projection region 57. The main body plate part 84 is designed such that the size L1 of the main body plate part 84 in the opposing direction FD is larger than L0, and the size W1 of the main body plate part 84 in the width direction WD is larger than W0. Moreover, L1 is designed to be larger than a size L2 from the outer peripheral surface 513 of one magnet 51 to the outer peripheral surface 513 of the other magnet 51. In FIG. 4, the projection region 57 on the exposed surface 82 is indicated by hatching, and the range that is covered by the magnetic shield member 80 is indicated by the enclosure by a heavy line.

The cylindrical plate part 86 is formed in a cylindrical shape and in a plate-shape, and is provided integrally with the main body plate part 84 along the outer edge of the main body plate part 84, and perpendicular to the main body plate part 84. As described above, the cylindrical plate part 86 is located in between the outer peripheral surface 513 of each magnet 51 and the main body rotation part 53.

By this arrangement of the main body plate part 84 and the cylindrical plate part 86, the magnetic shield member 80 contains therein the pair of magnets 51 from the outside in the axial direction AD.

The magnetic shield member 80 of the present embodiment is obtained by mixing magnetic powder, such as iron powder, with a resin material to restrict the leakage of the magnetic flux mf produced from the pair of magnets 51. Specifically, the pair of magnets 51 generate therearound the magnetic flux mf from one magnet 51 toward the other magnet 51. This magnetic flux mf is generated from the inner peripheral surface 511 and the outer peripheral surface 513 which serve as magnetic poles. The magnetic flux mf can flow around outward of the detection device 100 in the axial direction AD if the liquid-level detection device 100 has no magnetic shield member 80. However, the magnetic shield member 80 that is obtained by mixing magnetic powder, such as iron powder, with a resin material is provided to cover the entire projection region 57. Accordingly, most of the magnetic flux mf passes through the route inside the magnetic shield member 80 having higher magnetic permeability than the periphery of the magnetic shield member 80. In other words, most of the magnetic flux mf produced from the magnet on the opposite side from the outside of the exposed surface 82 in the axial direction AD is restricted from leaking outward of the exposed surface 82 in the axial direction AD. The density of magnetic flux mf passing through the magnetic shield member 80 from the pair of magnets 51 is designed not to exceed the saturated magnetic flux density of the magnetic shield member 80.

The operation and effects of the above-described first embodiment will be explained below.

The detection device 100 of the first embodiment includes the Hall IC 70 that outputs a detection result according to the density of the magnetic flux passing through the magnetoelectric conversion device 71 by the pair of magnet parts 51 that are held by the rotatable body 50, which rotates in accordance with the liquid surface 91, to generate the magnetic flux passing through the supporting part 32. Accordingly, the liquid surface level can be detected accurately by the magnetoelectric conversion device 71. For the exposed surface 82 of the rotatable body 50 that is located in the direction of the projection of the supporting part 32 and the pair of magnet parts 51 and that is exposed into the container, the magnetic shield member 80 that limits the magnetic flux leakage is provided to cover the entire part of the projection region 57 of the space located between the pair of magnet parts 51 outward in the axial direction AD. Consequently, the configuration of the magnetic circuit can be restricted by the connection of the metallic foreign matter attached on the exposed surface 82 on the projection region 57. As a result, the accuracy in output of the magnetoelectric conversion device 71 can be stabilized.

In the first embodiment, the magnetic flux mf passing from each magnet part 51 toward the exposed surface 82 does not easily escape outward of the magnetic shield member 80 by the magnetic shield member 80 through which the density of magnetic flux mf passing through from each magnet part 51 does not exceed the saturated magnetic flux density. Thus, leakage of the magnetic flux mf can be inhibited.

In the first embodiment, the magnetic flux mf passing from each magnet part 51 toward the exposed surface 82 does not easily escape outward of the magnetic shield member 80, by the magnetic shield member 80 which is formed in a cylindrical shape with the bottom containing therein the pair of magnet parts 51. Accordingly, the magnetic circuit can be constituted reliably by the metallic foreign matter attached on the exposed surface 82 to stabilize accuracy in output of the magnetoelectric conversion device 71.

Furthermore, since the magnetic shield member 80 of the first embodiment is obtained by mixing magnetic powder with resin, the magnetic shield member 80 weighs less. As a consequence, the liquid-level detection device 100 that is lightweight and that constitutes the magnetic circuit by the metallic foreign matter attached on the exposed surface 82 to stabilize accuracy in output of the magnetoelectric conversion device 71 can be achieved.

In the first embodiment, the housing 20 may correspond to a "fixation body", the shaft part 32 may correspond to a "supporting part", and the magnet holder 50 may correspond to a "rotatable body". In addition, the magnet 51 may correspond to a "magnet part", the Hall IC 70 may correspond to a "detecting part", and the fuel tank 90 may correspond to a "container".

Second Embodiment

Figure 5:
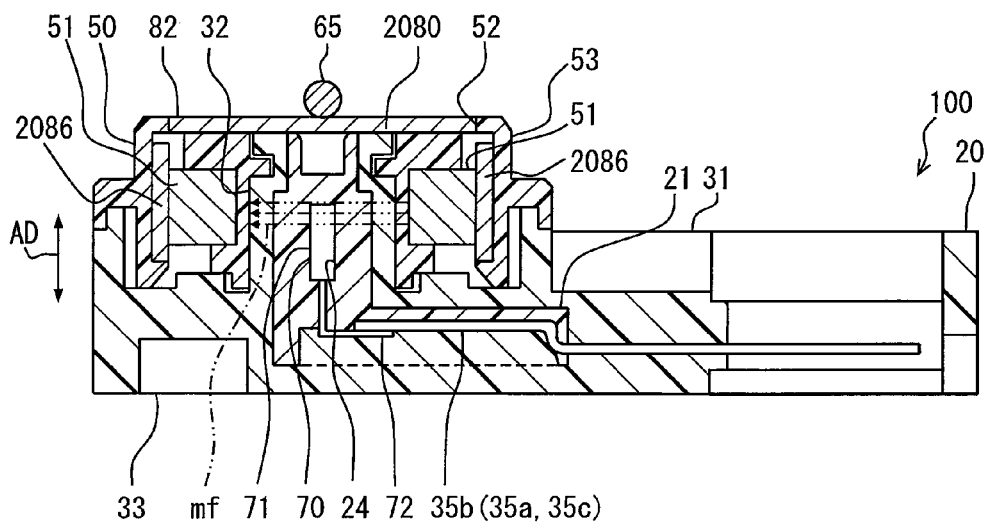
FIG. 5 is a sectional view of a second embodiment corresponding to FIG. 2.
Figure 6:
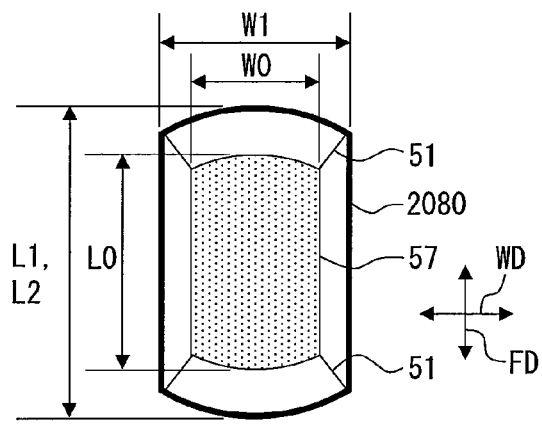
FIG. 6 is a schematic view of the second embodiment corresponding to FIG. 4.

As illustrated in FIGS. 5 and 6, a second embodiment is a modification to the first embodiment. The second embodiment will be described below with a focus on differences from the first embodiment.

A magnetic shield member 2080 of the present embodiment is formed in a plate-shape by mixing magnetic powder, such as iron powder, with a resin material, and is fitted into an opening 52 of a main body rotation part 53 from the outside in the axial direction AD. The magnetic shield member 2080 is fixed to the main body rotation part 53 by, for example, thermal caulking. The magnetic shield member 2080 is located outward of a shaft part 32 and magnets 51 (see FIG. 1) in the axial direction AD. As illustrated in FIG. 6, this magnetic shield member 2080 is provided to cover the entire projection region 57 similar to the first embodiment. It should be noted that the size L1 of the magnetic shield member 2080 in the opposing direction FD is designed to be substantially the same as L2 and that the size W1 of the magnetic shield member 2080 in the width direction WD is designed to be larger than W0.

In addition, a cylindrical plate member 2086 is provided separately from the magnetic shield member 2080. The cylindrical plate member 2086 is made of a magnetic material such as an iron plate, and is formed in a cylindrical shape and in a plate shape. The cylindrical plate member 2086 is disposed between an outer peripheral surface 513 of each magnet 51 and the main body rotation part 53.

The function of the magnetic shield member 2080 on an exposed surface 82 is similar to that of the first embodiment. Thus, as a result of the above-described configuration, the second embodiment can also achieve the operation and effects according as the first embodiment.

Third Embodiment

Figure 7:
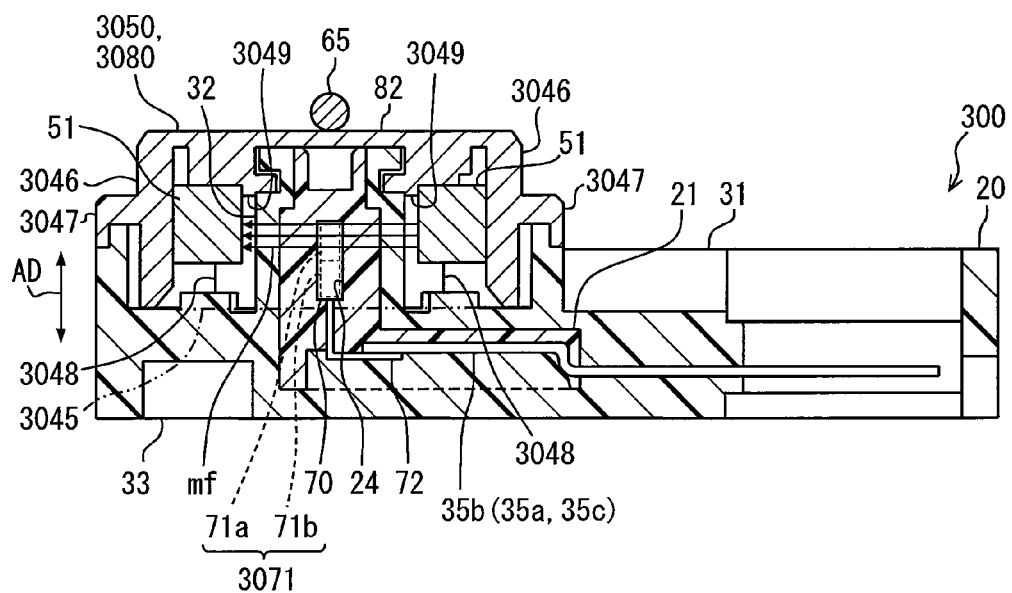
FIG. 7 is a sectional view of a third embodiment corresponding to FIG. 2.
Figure 8:
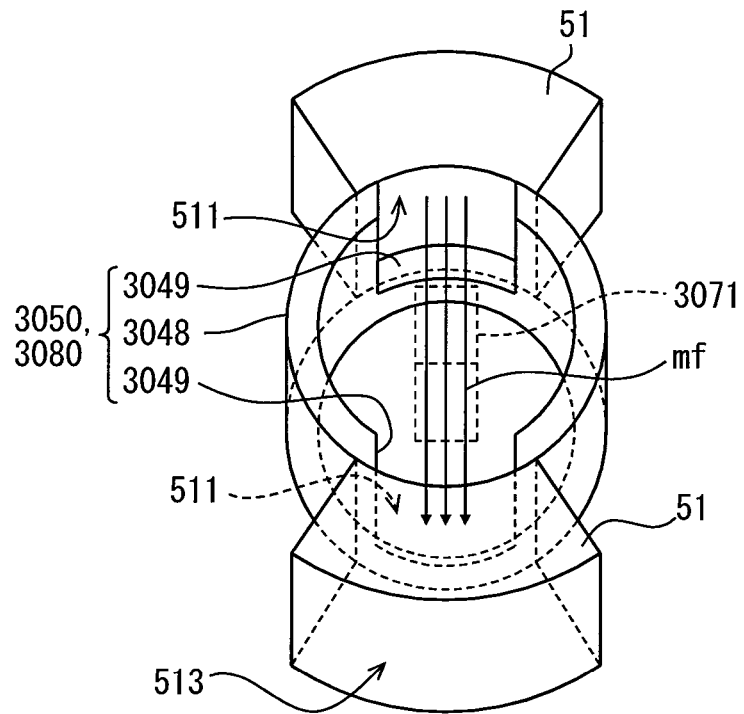
FIG. 8 is a partial schematic view illustrating an opening of a magnet holder of the third embodiment.

As illustrated in FIGS. 7 and 8, a third embodiment is a modification to the first embodiment. The third embodiment will be described below with a focus on differences from the first embodiment.

As illustrated in FIG. 7, a magnetoelectric conversion device 3071 in a liquid-level detection device 300 of the third embodiment is formed in a flat plate shape, and is accommodated in an element accommodating chamber 24 that is provided inside a shaft part 32 to be located between a pair of magnets 51. The magnetoelectric conversion device 3071 includes a detecting part 71a that is formed mainly from a semiconductor to detect the density of magnetic flux mf on the outer side in the axial direction AD. The magnetoelectric conversion device 3071 includes an integrated circuit 71b for converting the detection result into the detection signal on the opposite side from the outer side in the axial direction AD, i.e., on a lead wire 72-connection side. If an unintended external magnetic field acts on the integrated circuit 71b, adverse effects may be caused on the detecting part 71a due to the magnetization of the integrated circuit 71b.

The entire part of a magnet holder 3050 of the third embodiment is formed as a magnetic shield member 3080. Specifically, the magnet holder 3050 serving as the magnetic shield member 3080 is obtained by mixing the magnetic powder of soft magnetic material such as iron, permalloy or amorphous metal with resin material.

The magnet holder 3050 integrally includes a main body plate part 84, an outer cylindrical part 3046, and an inner cylindrical part 3048. Similar to the first embodiment, the main body plate part 84 is formed to have an exposed surface 82.

The outer cylindrical part 3046 projects perpendicularly from the main body plate part 84 toward the opposite side from the outer side in the axial direction AD to have a cylindrical shape. The outer cylindrical part 3046 includes a flange 3047 that projects outward of the rotation axis. The flange 3047 increases the saturated magnetic flux density as a part of the magnetic shield member 3080, and is brought into contact with a housing 20 in the case of the magnet holder 3050 chattering. Because of the main body plate part 84 and the outer cylindrical part 3046, the magnet holder 3050 serving as the magnetic shield member 3080 is formed into a cylindrical shape with the bottom containing therein the pair of magnets 51.

The outer cylindrical part 3046 that projects toward the opposite side from the outer side in the axial direction AD contains therein the magnetoelectric conversion device 3071. In other words, the magnetoelectric conversion device 3071 is disposed axially (AD) outward of an end surface 3045 of the outer cylindrical part 3046 of the magnet holder 3050 serving as the magnetic shield member 3080, with the end surface 3045 located on the opposite side from the outside in the axial direction AD.

The inner cylindrical part 3048 projects perpendicularly from the main body plate part 84 toward the opposite side from the outer side in the axial direction AD to have a cylindrical shape for bearing the shaft part 32. Each magnet 51 is held by the magnet holder 3050 between the inner cylindrical part 3048 and the outer cylindrical part 3046. As illustrated in FIG. 8, an opening 3049 through which the magnetic flux mf passes between the inner peripheral surface 511 of the magnet 51 and the detecting part 71a of the magnetoelectric conversion device 3071 is provided at the part of the inner cylindrical part 3048 that corresponds to an inner peripheral surface 511 of each magnet 51.

The function of the magnetic shield member 3080 on the exposed surface 82 is similar to the first embodiment. Thus, as a result of the above-described configuration, the third embodiment can also achieve the operation and effects according as the first embodiment.

In the third embodiment, the magnetoelectric conversion device 3071 is disposed axially (AD) outward of the end surface 3045 of the magnetic shield member 3080 on its opposite side from the outside in the axial direction AD. The magnetic shield member 3080 is formed into a cylindrical shape with the bottom containing therein the pair of magnets 51. Accordingly, the magnetic flux mf flowing from each magnet 51 toward the exposed surface 82 does not easily escape outside of the magnetic shield member 3080. Furthermore, the influence of the external magnetic field on the magnetoelectric conversion device 3071 can be curbed. As a result, the accuracy in output of the magnetoelectric conversion device 3071 can be stabilized.

Additionally, in the third embodiment, the entire part of the magnet holder 3050 is formed as the magnetic shield member 3080. Consequently, the saturated magnetic flux density of the magnetic shield member 3080 can be increased with its manufacture facilitated.

The embodiments have been described above. The present disclosure is not interpreted by limiting to these embodiments, and can be applied to various embodiments and their combination without departing from the scope of the disclosure. Modifications to the above embodiments will be described below.

Specifically, in a first modification, the magnetic shield member 80, 2080, 3080 may be made of a magnetic material such as an iron plate. The cylindrical plate member 2086 of the second embodiment may be obtained by mixing magnetic powder, such as iron powder, with a resin material as long as it limits the magnetic flux leakage. The cylindrical plate member 2086 may be made of the same material as or different material from the magnetic shield member 2080.

In a second modification, the density of magnetic flux mf passing through the magnetic shield member 80, 2080, 3080 from the magnet 51 may exceed the saturated magnetic flux density of the magnetic shield member 80, 2080.

Figure 9:
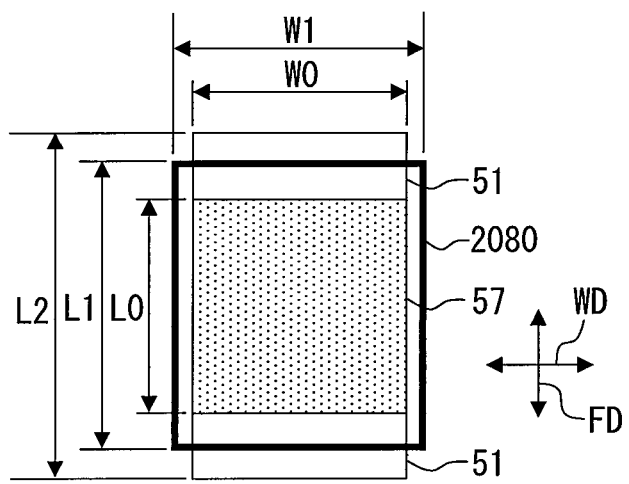
FIG. 9 is a schematic view illustrating a modification to FIG. 6.

In a third modification, as illustrated in FIG. 9, L1 of the magnetic shield member 2080 may be designed to be larger than L0 and to be smaller than L2 as long as the magnetic shield member 2080 covers the entire projection region 57. In the example of FIG. 7, W1 is designed to be larger than W0.

Figure 10:
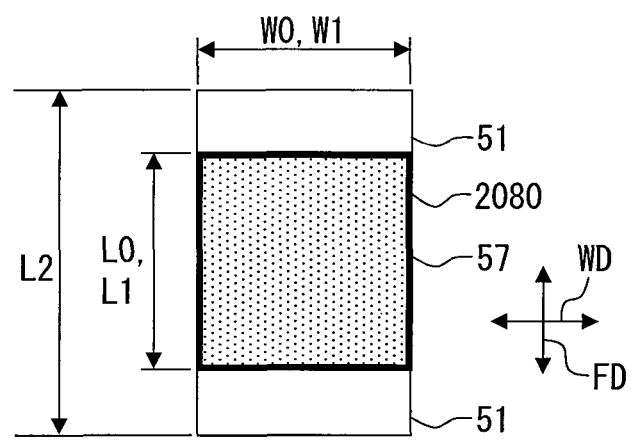
FIG. 10 is a schematic view illustrating a modification to FIG. 6.

In a fourth modification, as illustrated in FIG. 10, if the magnetic shield member 2080 covers the entire projection region 57, L1 of the magnetic shield member 2080 may be designed to be substantially the same as L0, and W1 of the magnetic shield member 2080 may be designed to be substantially the same as W0.

In a fifth modification, the present disclosure may include a liquid-level detection device in a container for another liquid loaded onto a vehicle such as brake fluid, engine coolant, or engine oil. In addition, the present disclosure is applicable to a liquid-level detection device which is disposed in a liquid container provided for various domestic apparatuses or various transport machines, as well as to a liquid-level detection device for a vehicle.

In a sixth modification, the magnetic shield member 80, 2080, 3080 may be metal-plated on the surface of a base material made from synthetic resin.

In a seventh modification, a coating material obtained by mixing the magnetic powder of soft magnetic material such as iron, permalloy or amorphous metal may be applied to the surface of a base material made from synthetic resin to produce the magnetic shield member 80, 2080, 3080.

In an eighth modification, by forming the thickness of the inner cylindrical part 3048 to be sufficiently thinner than the outer cylindrical part 3046, the magnetic flux may pass through the inner cylindrical part 3048 between the inner peripheral surface 511 of the magnet 51 and the detecting part 71a of the magnetoelectric conversion device 3071.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid-level detection device for detecting a level of a surface of liquid stored in a container, comprising:
   a rotatable body that rotates in accordance with the surface of liquid;
   a fixation body that includes:
   a main body part fixed to the container; and
   a supporting part projecting from the main body part in an axial direction along a rotation axis of the rotatable body to rotatably support the rotatable body;
   a pair of magnet parts that are held by the rotatable body in an arrangement positioning the supporting part therebetween and that generates a magnetic flux passing through the supporting part; and
   a detecting part that includes a magnetoelectric conversion device disposed in the supporting part and that outputs a detection result according to a density of the magnetic flux passing through the magnetoelectric conversion device, wherein:
   the rotatable body includes a magnetic shield member entirely covering a projection region of a space located between the pair of magnet parts, which is projected outward in the axial direction, to limit leakage of the magnetic flux; and
   the magnetic shield member is located outward of the supporting part and the pair of magnet parts in the axial direction to include an exposed surface which is exposed into the container.

2. The liquid-level detection device according to claim 1, wherein a density of the magnetic flux passing through the magnetic shield member from each of the pair of magnet parts does not exceed a saturated magnetic flux density of the magnetic shield member.

3. The liquid-level detection device according to claim 1, wherein the magnetic shield member is formed into a cylindrical shape with a bottom containing therein the pair of magnet parts.

4. The liquid-level detection device according to claim 3, wherein the magnetoelectric conversion device is disposed outward of an end surface of the magnetic shield member in the axial direction with the end surface located on an opposite side of the magnetic shield member from outside in the axial direction.

5. The liquid-level detection device according to claim 1, wherein the magnetic shield member is obtained by mixing magnetic powder with resin.

6. The liquid-level detection device according to claim 1, wherein an entire part of the rotatable body is formed as the magnetic shield member.

7. The liquid-level detection device according to claim 1, wherein
   the magnetic shield member includes a main body plate part integrally formed with a cylindrical plate part,
   the exposed surface is located on the main body plate, and
   the cylindrical plate part is fitted on an outer peripheral surface of each of the pair of magnet parts.

8. The liquid-level detection device according to claim 7, wherein the cylindrical plate part is fitted in between the outer peripheral surface of each of the pair of magnet parts and the rotatable body.

* * * * *